US008232866B2

(12) United States Patent
McGrath et al.

(10) Patent No.: US 8,232,866 B2
(45) **Date of Patent: *Jul. 31, 2012**

(54) SYSTEMS AND METHODS FOR REMOTE LONG STANDOFF BIOMETRIC IDENTIFICATION USING MICROWAVE CARDIAC SIGNALS

(75) Inventors: William R. McGrath, Monrovia, CA (US); Ashit Talukder, Simi Valley, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/977,740

(22) Filed: Dec. 23, 2010

(65) Prior Publication Data

US 2012/0068819 A1 Mar. 22, 2012

Related U.S. Application Data

(63) Continuation-in-part of application No. 11/784,207, filed on Apr. 5, 2007, now Pat. No. 7,889,053.

(60) Provisional application No. 60/789,458, filed on Apr. 5, 2006.

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl. ........ 340/5.82; 340/5.1; 340/5.21; 340/5.8; 340/5.81; 340/505

(58) Field of Classification Search ............ 340/5.1–5.2, 340/5.8–5.82, 505, 825.77; 342/22, 28, 114, 342/115, 160, 162

See application file for complete search history.

(56) References Cited

U.S. PATENT DOCUMENTS 4,958,638 A * 9/1990 Sharpe et al. ................. 600/407

(Continued)

FOREIGN PATENT DOCUMENTS

KR 10-2003-0070315 8/2003

(Continued)

OTHER PUBLICATIONS

International Search Report for Application No. PCT/US2010/062036 filed Dec. 23, 2010, dated Aug. 31, 2011, mailed Aug. 31, 2011, 3 pages.

(Continued)

*Primary Examiner* — Benjamin Lee
*Assistant Examiner* — Son M Tang
(74) *Attorney, Agent, or Firm* — Christie, Parker & Hale, LLP

(57) ABSTRACT

Systems and methods for remote, long standoff biometric identification using microwave cardiac signals are provided. In one embodiment, the invention relates to a method for remote biometric identification using microwave cardiac signals, the method including generating and directing first microwave energy in a direction of a person, receiving microwave energy reflected from the person, the reflected microwave energy indicative of cardiac characteristics of the person, segmenting a signal indicative of the reflected microwave energy into a waveform including a plurality of heart beats, identifying patterns in the microwave heart beats waveform, and identifying the person based on the identified patterns and a stored microwave heart beats waveform.

40 Claims, 14 Drawing Sheets

U.S. PATENT DOCUMENTS

| | | | | | |
|---|---|---|---|---|---|
| 5,448,501 | A | * | 9/1995 | Hablov et al. | 340/573.1 |
| 5,507,291 | A | * | 4/1996 | Stirbl et al. | 600/407 |
| 5,760,687 | A | * | 6/1998 | Cousy | 340/554 |
| 5,861,021 | A | | 1/1999 | Thome et al. | |
| 5,904,709 | A | | 5/1999 | Arndt et al. | |
| 6,026,173 | A | * | 2/2000 | Svenson et al. | 382/131 |
| 6,031,482 | A | * | 2/2000 | Lemaitre et al. | 342/22 |
| 6,057,761 | A | * | 5/2000 | Yukl | 340/568.1 |
| 6,208,286 | B1 | * | 3/2001 | Rostislavovich et al. | 342/135 |
| 6,307,475 | B1 | * | 10/2001 | Kelley | 340/573.1 |
| 6,313,743 | B1 | * | 11/2001 | Abraham-Fuchs et al. | 340/505 |
| 6,909,397 | B1 | * | 6/2005 | Greneker, III et al. | 342/173 |
| 6,927,691 | B2 | * | 8/2005 | Yukl | 340/568.1 |
| 7,135,980 | B2 | * | 11/2006 | Moore et al. | 340/573.1 |
| 7,199,749 | B2 | * | 4/2007 | Greneker et al. | 342/22 |
| 7,679,545 | B2 | * | 3/2010 | Rausch et al. | 342/22 |
| 7,889,053 | B2 | | 2/2011 | McGrath et al. | |
| 2002/0138768 | A1 | * | 9/2002 | Murakami et al. | 713/202 |
| 2003/0130697 | A1 | * | 7/2003 | Halperin et al. | 607/2 |
| 2003/0135097 | A1 | | 7/2003 | Wiederhold et al. | |
| 2003/0178034 | A1 | * | 9/2003 | Yuki | 128/922 |
| 2004/0123667 | A1 | | 7/2004 | McGrath | |
| 2006/0028389 | A1 | * | 2/2006 | Yukl | 343/853 |
| 2007/0066904 | A1 | * | 3/2007 | Wiesmann et al. | 600/508 |
| 2008/0045832 | A1 | * | 2/2008 | McGrath | 600/427 |

FOREIGN PATENT DOCUMENTS

| | | |
|---|---|---|
| WO | WO 2007/118274 | 10/2007 |
| WO | WO2008/054490 A2 | 5/2008 |

OTHER PUBLICATIONS

Written Opinion for Application No. PCT/US2010/062036 filed Dec. 23, 2010, dated Aug. 31, 2011, mailed Aug. 31, 2011, 3 pages.

* cited by examiner

| True Class (Rows) / Classified As (Columns) | 1 | 2 | 3 | 4 | 5 | 6 | 7 | 8 | 9 | 10 | 11 | Unknown (No majority) |
|---|---|---|---|---|---|---|---|---|---|---|---|---|
| **Individual 1** | 0.83 | 0 | 0.03 | 0 | 0 | 0 | 0 | 0 | 0 | 0.05 | 0 | 0.09 |
| **Individual 2** | 0 | 0.91 | 0 | 0 | 0 | 0 | 0.55 | 0 | 0 | 0 | 0 | 0.04 |
| **Individual 3** | 0 | 0 | 0.96 | 0 | 0 | 0 | 0 | 0 | 0 | 0.04 | 0 | 0 |
| **Individual 4** | 0 | 0 | 0 | 1.0 | 0 | 0 | 0 | 0 | 0 | 0 | 0 | 0 |
| **Individual 5** | 0 | 0 | 0 | 0 | 0.65 | 0.05 | 0 | 0 | 0.21 | 0 | 0 | 0.09 |
| **Individual 6** | 0 | 0 | 0 | 0.04 | 0 | 0.96 | 0 | 0 | 0 | 0 | 0 | 0 |
| **Individual 7** | 0 | 0.1 | 0 | 0 | 0 | 0 | 0.77 | 0.08 | | 0 | 0 | 0.05 |
| **Individual 8** | 0 | 0 | 0 | 0 | 0 | 0 | 0.07 | 0.83 | 0 | 0 | 0 | 0.1 |
| **Individual 9** | 0 | 0 | 0 | 0 | 0 | 0 | 0 | 0 | 1.0 | 0 | 0 | 0 |
| **Individual 10** | 0 | 0 | 0 | 0 | 0 | 0 | 0 | 0 | 0 | 1.0 | 0 | 0 |
| **Individual 11** | 0 | 0 | 0 | 0 | 0 | 0 | 0 | 0 | 0 | 0 | 0.99 | 0.01 |

FIG. 15

| True Class (Rows) / Classified As (Columns) | 1 | 2 | 3 | 4 | 5 | 6 | 7 | 8 | 9 | 10 | 11 | Unknown (No majority) |
|---|---|---|---|---|---|---|---|---|---|---|---|---|
| **Individual 1** | 0.87 | 0 | 0 | 0 | 0 | 0 | 0 | 0 | 0 | 0 | 0 | 0.13 |
| **Individual 2** | 0 | 0.93 | 0 | 0 | 0 | 0 | 0.05 | 0 | 0 | 0 | 0 | 0.02 |
| **Individual 3** | 0 | 0 | 1.0 | 0 | 0 | 0 | 0 | 0 | 0 | 0 | 0 | 0 |
| **Individual 4** | 0 | 0 | 0 | 1.0 | 0 | 0 | 0 | 0 | 0 | 0 | 0 | 0 |
| **Individual 5** | 0 | 0 | 0 | 0 | 0.75 | 0 | 0 | 0 | 0.07 | 0 | 0 | 0.18 |
| **Individual 6** | 0 | 0 | 0 | 0 | 0 | 1.0 | 0 | 0 | 0 | 0 | 0 | 0 |
| **Individual 7** | 0 | 0.03 | 0 | 0 | 0 | 0 | 0.87 | 0 | | 0 | 0 | 0.1 |
| **Individual 8** | 0 | 0 | 0 | 0 | 0 | 0 | 0.05 | 0.88 | 0 | 0 | 0 | 0.07 |
| **Individual 9** | 0 | 0 | 0 | 0 | 0 | 0 | 0 | 0 | 1.0 | 0 | 0 | 0 |
| **Individual 10** | 0 | 0 | 0 | 0 | 0 | 0 | 0 | 0 | 0 | 1.0 | 0 | 0 |
| **Individual 11** | 0 | 0 | 0 | 0 | 0 | 0 | 0 | 0 | 0 | 0 | 0.99 | 0.01 |

FIG. 16

| True Class (Rows) / Classified As (Columns) | 1 | 2 | 3 | 4 | 5 | 6 | 7 | 8 | 9 | 10 | 11 | Unknown (No majority) |
|---|---|---|---|---|---|---|---|---|---|---|---|---|
| Individual 1 | 0.83 | 0 | 0 | 0 | 0 | 0 | 0 | 0 | 0 | 0 | 0 | 0.16 |
| Individual 2 | 0 | 0.91 | 0 | 0 | 0 | 0 | 0 | 0 | 0 | 0 | 0 | 0.09 |
| Individual 3 | 0 | 0 | 1.0 | 0 | 0 | 0 | 0 | 0 | 0 | 0 | 0 | 0 |
| Individual 4 | 0 | 0 | 0 | 1.0 | 0 | 0 | 0 | 0 | 0 | 0 | 0 | 0 |
| Individual 5 | 0 | 0 | 0 | 0 | 0.77 | 0 | 0 | 0 | 0.07 | 0 | 0 | 0.16 |
| Individual 6 | 0 | 0 | 0 | 0 | 0 | 1.0 | 0 | 0 | 0 | 0 | 0 | 0 |
| Individual 7 | 0 | 0 | 0 | 0 | 0 | 0 | 0.97 | 0 | | 0 | 0 | 0.03 |
| Individual 8 | 0 | 0 | 0 | 0 | 0 | 0 | 0 | 0.92 | 0 | 0 | 0 | 0.08 |
| Individual 9 | 0 | 0 | 0 | 0 | 0 | 0 | 0 | 0 | 1.0 | 0 | 0 | 0 |
| Individual 10 | 0 | 0 | 0 | 0 | 0 | 0 | 0 | 0 | 0 | 1.0 | 0 | 0 |
| Individual 11 | 0 | 0 | 0 | 0 | 0 | 0 | 0 | 0 | 0 | 0 | 0.97 | 0.02 |

FIG. 17

SYSTEMS AND METHODS FOR REMOTE LONG STANDOFF BIOMETRIC IDENTIFICATION USING MICROWAVE CARDIAC SIGNALS

CROSS-REFERENCE TO RELATED APPLICATION(S)

This application is a continuation-in-part of U.S. patent application Ser. No. 11/784,207, filed on Apr. 5, 2007, now U.S. Pat. No. 7,889,053 issued Feb. 15, 2011, which claims priority to and the benefit of U.S. Provisional Application No. 60/789,458, filed on Apr. 5, 2006, the entire content of both applications is incorporated herein by reference.

STATEMENT REGARDING FEDERALLY SPONSORED RESEARCH

The invention described herein was made in the performance of work under a NASA contract, and is subject to the provisions of Public Law 96-517 (35 USC 202) in which the Contractor has elected to retain title.

FIELD

The present invention relates generally to biometric identification, and more specifically, to systems and methods for remote long standoff biometric identification using microwave cardiac signals.

BACKGROUND

Accurate identification of people is very important for law enforcement, as well as for many security and fraud-detection applications in the public and private sectors. Conventional identification methods employ high-resolution optical and infrared cameras or scanners to image the face, or read finger prints or iris patterns in the eye. These approaches work with reasonable accuracy but usually require direct, or extremely close, contact with the person to be identified: for example, by placing a hand on the scanner plate to record fingerprints, or placing one's head against a positioning-frame to allow a lens to produce a high-resolution image of the eye.

Biometric identification based on fingerprints has been widely deployed commercially in recent years for security and immigration applications, and is even being used in some personal computer systems for user login-identification. However, such systems are sensitive to the presence of dirt on the fingers, often require reapplication of the finger, and are sensitive to variants such as the pressure of the finger during the fingerprint acquisition process. Fingerprint identification can also be fooled by using artificial gummy fingers. Facial recognition methods, on the other hand, are not necessarily limited to very-close range, but the subject must generally be facing in the direction of a camera since a clear, well-lit image is required. Thus it is relatively easy to evade such systems by wearing a disguise, a face mask, or tilting the head down to avoid providing a clear image of the face. Visual face recognition methods of course depend heavily on the quality of the image, which renders such systems sensitive to range, aspect view, and illumination.

There has been increased interest in recent years for a non-contacting, remote method of identifying a person with high accuracy over distances of at least several meters. It is needed for many security, law enforcement, and intelligence gathering operations, as well as for secure access to critical computer systems. However, none of the currently available techniques can meet this need.

SUMMARY

Aspects of the present invention relate to systems and methods for remote long standoff biometric identification using microwave cardiac signals. In one embodiment, the invention relates to a system for biometrically identifying a person using microwave signals, the system including at least one processor configured to receive a microwave cardiac signal comprising cardiac beats, the microwave cardiac signal obtained from reflected microwave signals comprising an electrocardiographic-related waveform and an impedance-cardiographic-related waveform, segment the microwave cardiac signal into segments, extract features from the segments, and perform pattern identification of the segments and features with a pre-existing data set.

In another embodiment, the invention relates to a method for biometrically identifying a person using microwave signals, the method including receiving a microwave cardiac signal comprising cardiac beats, the microwave cardiac signal obtained from reflected microwave signals comprising an electrocardiographic-related waveform and an impedance-cardiographic-related waveform, segmenting the microwave cardiac signal into individual segments, extracting features from the segments, and performing pattern identification of the features in the individual segments with a pre-existing data set.

In yet another embodiment, the invention relates to a method for remote biometric identification using microwave cardiac signals, the method including generating and directing first microwave energy in a direction of a person, receiving microwave energy reflected from the person, the reflected microwave energy indicative of cardiac characteristics of the person, the cardiac characteristics comprising an electrocardiographic-related characteristic and an impedence-cardiographic-related characteristics, segmenting a signal indicative of the reflected microwave energy into a waveform indicative of a plurality of heart beats and the cardiac characteristics, identifying patterns in the microwave waveform, and identifying the person based on the identified patterns and a stored microwave waveform.

In still yet another embodiment, the invention relates to a system for remote biometric identification using microwave cardiac signals, the system including microwave measurement circuitry configured to generate a microwave signal, transmit the microwave signal in a direction of a person, receive microwave energy reflected from the person, the reflected energy including cardiac characteristics of the person, the cardiac characteristics comprising an electrocardiographic-related characteristic and an impedence-cardiographic-related characteristic, and generate a signal indicative of the reflected microwave energy, and processing circuitry configured to segment the reflected microwave energy signal into a microwave waveform indicative of a plurality of heart beats and the cardiac characteristics, identify patterns in the microwave waveform; and identify the person based on the identified patterns and a stored microwave waveform.

BRIEF DESCRIPTION OF THE DRAWINGS

FIG. 15 is a table showing a classification identification matrix resulting from inputting microwave cardiac signals for eleven individuals into a classifier while considering three heartbeats for identification estimation in accordance with one embodiment of the invention.

FIG. 16 is a table showing a classification identification matrix resulting from inputting microwave cardiac signals for eleven individuals into a classifier while considering five heartbeats for identification estimation in accordance with one embodiment of the invention.

FIG. 17 is a table showing a classification identification matrix resulting from inputting microwave cardiac signals for eleven individuals into a classifier while considering seven heartbeats for identification estimation in accordance with one embodiment of the invention.

DETAILED DESCRIPTION

Figure 1:
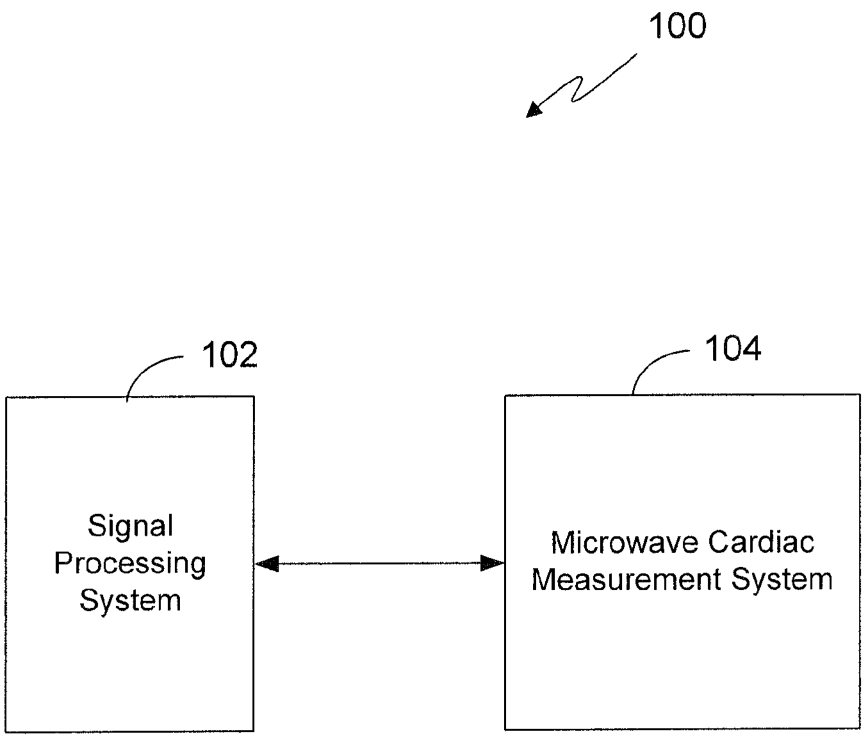
FIG. 1 is a schematic block diagram of a biometric identification system for obtaining and processing microwave cardiac signals in accordance with one embodiment of the invention.

In the description that follows, the scope of the term "some embodiments" is not to be so limited as to mean more than one embodiment, but rather, the scope may include one embodiment, more than one embodiment, or perhaps all embodiments.

In the past few years, it has been demonstrated that an electrocardiographic (ECG) waveform may be used to identify a person, with an accuracy of about 98%. This is significantly better than the typical accuracy of a fingerprint. However, an ECG usually requires at least two or three electrodes attached to the person, which has limited its usefulness in real world applications. A recently developed microwave cardiogram system, disclosed in a published U.S. patent application (U.S. Patent Publ. No. 2004/0123667, now U.S. Pat. No. 7,272,431), may be employed to provide a unique bio-signature for a person. This approach uses a specially designed microwave transceiver to form a narrow beam directed at the person of interest. The reflected microwave signal contains both the electrocardiographic waveform and the impedance-cardiographic (ICG) waveform of a person. This technique works over large distances, up to tens of meters, and it is very difficult to alter or disguise the ECG and ICG waveforms because they are a fundamental aspect of a person's physiology. The microwave signal may penetrate barriers such as walls and doors, allowing for new capabilities in human identification.

Applicants have recently developed the microwave remote sensing technique referenced above that allows for the measurement of unique cardiac-related waveforms from distances of at least 15 feet, and through barriers such as walls and doors, with an accuracy of about 92% or better. This technology is described in U.S. Pat. Nos. 7,811,234 and 7,272,431, and a co-pending application corresponding to U.S. Patent Appl. Publ. No. 2005/0220310, the entire content of each reference is incorporated by reference herein. In several embodiments, the basic system includes a microwave transceiver with a high-gain antenna that can direct a narrow microwave beam onto a person's torso, and receive the reflected RF signal back through the same antenna. The amplitude and phase of the reflected signal can have a relatively large DC (Direct Current, or static) component due to the static component of the permittivity of the illuminated tissue, and a small, unique time-varying component of the permittivity. The unique time-varying component can be due to a number of factors including, without limitation, the time-dependent electrical action of the heart (these components correspond to the P-wave, T-wave, and QRS-wave produced during a heart cycle), a time-dependent conductance due to the blood-flow in the illuminated tissue, and a time-varying component of the signal phase due to the micro-motion (i.e., acoustic vibrations) on the surface of the torso caused by the mechanical action of the heart, commonly referred to as a phonocardiogram.

The reflected microwave beam can thus contain a composite of several cardiac-related physiological components which are unique to a particular individual. Many or all of the prior art studies that have investigated microwave reflections from the human body appear to have treated the body as having a fixed permittivity, and hence a fixed microwave amplitude reflection coefficient at the air-tissue interface. However, Applicants have recently observed that the electrical action of the beating heart drives ion currents (primarily $Na^+$ and $Cl^-$) in the extra-cellular fluid just below the skin (i.e., dermis). It is these changes in ion concentration, due to the ion currents, that can be measured by a standard contacting electrocardiogram (which can use AgCl electrodes). These changes in ionic concentration also change the permittivity of the extra-cellular fluid, thus changing the microwave reflection coefficient at the air-tissue interface. This leads to a unique amplitude modulation of the reflected microwave signal. It should also be noted that the micro-motions present in the reflected microwave signal contains the well-known heart sounds, S1 and S2, which are key components of the phonocardiogram and also unique to a particular heart. Thus the composite cardiac-related microwave waveform contains several unique physiological features of a particular person.

While not bound by any particular theory, it is believed that the microwave cardiac waveform also has the advantage that it cannot be confounded or "faked". Only the person to be identified will have the unique composite microwave cardiac waveform as previously measured, including the unique arrangement of veins for blood flow. The waveform will also depend on the details of the microwave system used to obtain the original training data. In one embodiment, for example, the system could be very narrowband at any one of hundreds of frequencies. In other embodiments, the system could use spread-spectrum techniques or special encoding techniques. In addition, a person's cardiac physiology is a part of their living body. There is no known way of exactly reproducing a living human body. Thus, it is believed that this form of biometric can meet the need for a long standoff (cardiac signatures captured by embodiments described herein have been measured from distances up to 15 feet or more), and is extremely secure.

Several embodiments of the invention use a microwave cardiogram as a biometric identifier or bio-signature for an individual. As referenced above, the microwave cardiogram may be measured over distances of several meters, and through barriers such as doors and walls using a microwave signal, to provide a non-contacting, remote sensing method to accurately identify specific individuals.

A number of embodiments process in real time the reflected microwave signal, which contains the cardiac signature of the person, using digital signal processing techniques. Some embodiments use machine learning-template methods to segment out each cardiac beat, and then employ statistical measures to compare a few beats of the microwave cardiogram to a pre-existing data set in order to identify the individual.

FIG. 1 is a schematic block diagram of a human or biometric identification system 100 for obtaining and processing microwave cardiac signals in accordance with one embodiment of the invention. The remote microwave cardiogram human identification system 100 according to some embodiments may include two primary subsystems: an active microwave system 104 to remotely measure the cardiac related waveforms of an individual, and a back-end signal processing system 102 to determine the identity of an individual based on his or her microwave reflection signal. As discussed above, the measurement of the microwave cardiogram is the subject matter of published U.S. patent application Ser. No. 10/632,347 (publication number 2004/0123667, now U.S. Pat. No. 7,272,431), the entire content of which is incorporated herein by reference.

An example of a remote cardiogram human identification system according to an embodiment may be described as follows. An RF (Radio Frequency) oscillator generates a microwave signal that is coupled to a high-directivity antenna by a circulator. This antenna forms a narrow beam directed at the person to be identified. A fraction of the incident signal is reflected back from the person and picked up by the same antenna. The received signal is amplified, bandpass filtered, and the signal power level is measured with a conventional detector. This signal power waveform is supplied to a back-end signal processing system for real time analysis. The microwave power levels used are typically less than 1 milliwatt, and are expected to be hundreds to thousands of times lower than the maximum permissible dose level considered safe by the IEEE Standards Committee on RF Exposure.

The amplitude of the reflected signal will have a relatively large DC (Direct Current, or static) component due to the static, or basal, impedance of the illuminated tissue, and a small, unique time-varying component due the time-dependent impedance of the tissue. The microwave beam penetrates several millimeters of skin tissue only, and thus is affected primarily by changes in the impedance of the dermis, which contains blood vessels, as well as a significant amount of extracellular fluid in the supporting matrix. There are at least two contributions to the total time dependent impedance of interest: the volume of blood present in the tissue, and the concentration of ions (Na+, CI− and others) in the extracellular fluid. Both of these contributions are periodic in time, and are driven by the mechanical and electrical action of the heart. These cardiac-related time-dependent changes are relatively very small, about 0.5% or less of the basal impedance. However, these changes in the volume of blood and extracellular ion concentration uniquely modulate the amplitude of the reflected microwave signal to provide simultaneously the electrocardiographic waveform and impedance cardiographic waveform of the individual. This composite waveform may be referred to as the microwave cardiogram.

Embodiments of the biometric identification systems described herein can perform signal processing to process the microwave cardiogram signals and to determine the identity of the individual. The identification process may include two phases (sub-processes): an offline phase where a library of microwave cardiograms of known individuals are built up, and an on-line phase where the microwave cardiogram from an unknown individual is preprocessed, segmented, and matched against the library of known individuals constructed in the off-line phase.

For some embodiments, the library may be comprised of several examples of the microwave cardiogram of each individual under different conditions, including, but not limited to: different poses, viewpoints, or incident angles; different levels of exercise (or physical stress); different distances between the microwave transceiver and the person; and with different physical motions. This library of signals may be processed to yield a robust set of signatures and features that may be used to distinguish between different individuals.

Figure 2:
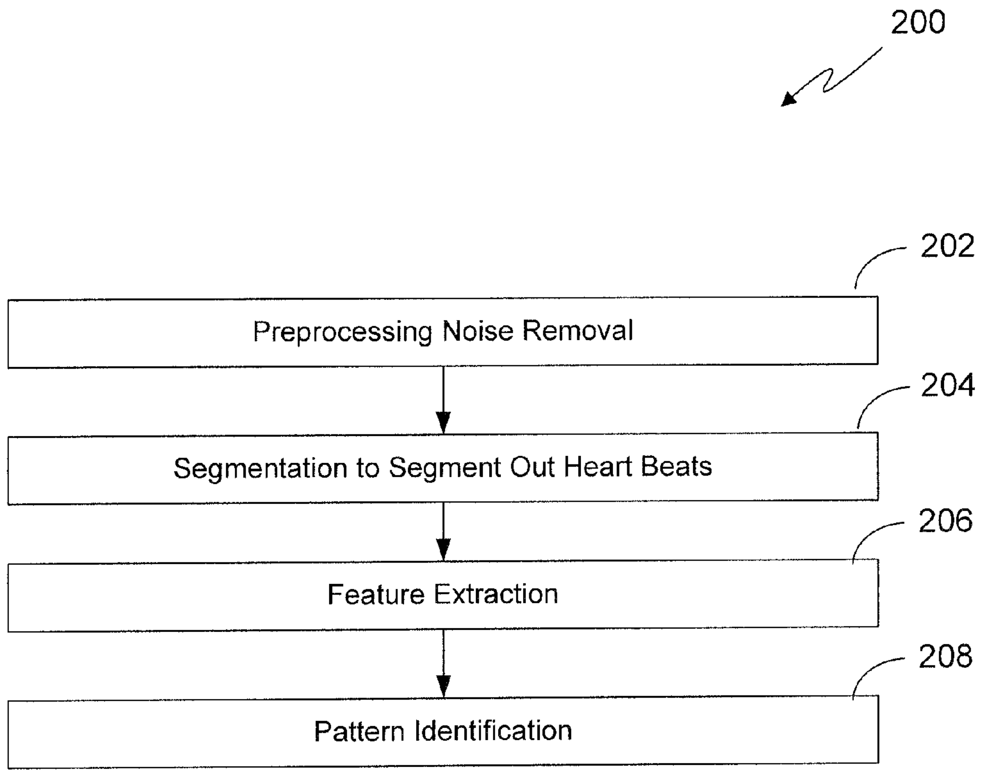
FIG. 2 is a flow chart of a process for processing microwave cardiac signals for biometric identification in accordance with one embodiment of the invention.

FIG. 2 is a flow chart of a process 200 for processing microwave cardiac signals for biometric identification in accordance with one embodiment of the invention. For the embodiment illustrated in FIG. 2, the signal processing may include, but is not limited to, preprocessing noise removal 202; a segmentation procedure to segment out each beat in the cardiac signal 204; a feature extraction procedure to derive salient features from each beat 206; and a pattern identification procedure 208 using the segmented signals and the salient features. For some embodiments, the process blocks in FIG. 2 may represent one or more software-controlled processes running on a computer system, special purpose or programmable modules, or perhaps combinations thereof.

In one embodiment, the process can perform the sequence of actions in a different order. In another embodiment, the process can skip one or more of the actions. In other embodiments, one of more of the actions are performed simultaneously. In some embodiments, additional actions can be performed.

Figure 3:
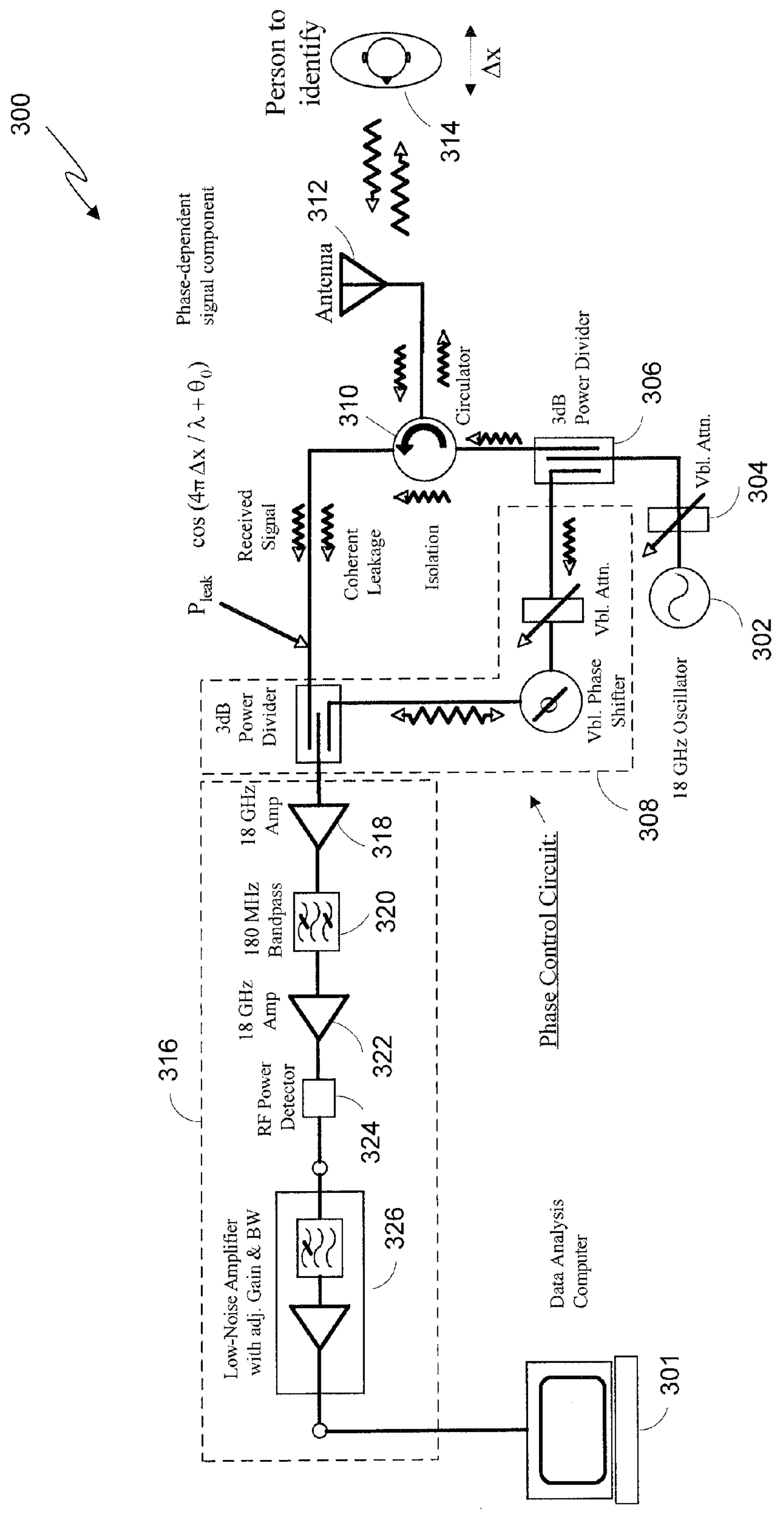
FIG. 3 is a schematic block diagram of a biometric identification system for obtaining and processing microwave cardiac signals in accordance with one embodiment of the invention.

FIG. 3 is a schematic block diagram of a biometric identification system 300 for obtaining and processing microwave cardiac signals in accordance with one embodiment of the invention. The biometric identification system 300 includes a computer or signal processing system 301 and a number of other components forming a microwave cardiac measurement system. For the measurement system, an 18 GHz oscillator 302 serves as the signal source. The power level is controlled by a 20 dB variable attenuator 304. The signal is then split by a 3 dB power divider 306. Half of the signal goes into a phase control circuit 308, and half goes to a circulator 310 where it is routed to a high-gain patch-array planar antenna 312. It is radiated in a narrow beam toward the subject of interest 314 (the radiated power is typically in the range of about 50 microwatts to about 1 milliwatt). The signal reflected signal from this person is received by the same antenna 312, and routed by the circulator 310 to the receiver portion 316 of the system.

Since real world components are not perfect, some of the source signal leaks the wrong direction around the circulator 310 and is injected directly into the receiver portion 316 of the system. This is where the phase control circuit 308 is used. The signal power coupled into it is coherent with the leakage signal of the isolator port of the circulator 310. Thus by adjusting the phase and amplitude of the signal in the phase control circuit to compensate for the leakage signal, then coupling this adjusted signal back into the receiver path, the overall phase sensitivity of the system can be controlled. The signal is then amplified by approximately 30 dB by a low-noise 18 GHz amplifier 318. In some embodiments, the phase control circuit 308 is also configured to reduce the effects of gross body motion. In one such embodiment, the phase control circuit is configured primarily to reduce the effects of gross body motion and secondarily to compensate for the leakage signal.

The signal in the receiver path is then filtered using a bandpass filter 320. The bandwidth of the filter can be in the range of about 18 MHz to 360 MHz. The bandpass filters 320 are used to reduce the overall noise of the receiver section to a desired level. The signal is then further amplified by about 30 dB using a second amplifier 322. A simple square-law, direct detector 324 is used to measure the total power in the signal. The output of the detector 324 contains the low-frequency cardiac-related modulation of the 18 GHz signal power. This low-frequency signal is further amplified and filtered in block 326 to optimize the signal-to-noise ratio. The signal is then digitized, and analyzed with unique digital signal processing algorithms (as described below) to retrieve the information necessary to identify the individual in question.

In the embodiment of the biometric identification system illustrated in FIG. 3 and described above, specific values, such as specific frequencies and gains, are indicated for particular components. In other embodiments, other suitable values can be used for those components.

In one embodiment, the amplitude of the signal reflected from the subject person can have a relatively large offset baseline component due to the static, or basal, impedance of the illuminated tissue, and a small, unique time-varying component due the time-dependent impedance, permittivity, and minute sound wave motion of the tissue. In such case, the microwave beam penetrates several millimeters of skin tissue, and thus is affected primarily by changes in the electrical properties of the dermis, which contains blood vessels, as well as a significant amount of extracellular fluid in the supporting matrix. As discussed above, there are at least two contributions to the total time dependent permittivity of interest: the volume of blood present in the tissue, and the concentration of ions (Na+, CI− and others) in the extracellular fluid. Both of these contributions are periodic in time, and are driven by the mechanical and electrical action of the heart. These cardiac-related time-dependent changes are relatively very small, about 0.5% or less of the basal impedance. However, these changes in the volume of blood and extracellular ion concentration uniquely modulate the amplitude of the reflected microwave signal, as does the mechanical motion of the heart, to provide simultaneously the electrocardiographic-related waveform, the impedance cardiographic-related waveform, and the phonocardiographic-related waveform of the individual. This composite waveform may be referred to as the microwave cardiogram.

While both the terms electrocardiographic-related waveform and electrocardiographic waveform are used in various sections of this application, they can be used interchangeably to refer to the electrocardiographic-like waveform obtained from microwave signals reflected from a person. Similarly, while both the terms impedance cardiographic-related waveform and impedance cardiographic waveform are used in various sections of this application, they can be used interchangeably to refer to the impedance cardiographic-like waveform obtained from microwave signals reflected from a person. Similarly, while both the terms phonocardiographic waveform and phonocardiographic-related waveform are used in various sections of this application, they can be used interchangeably to refer to the phonocardiographic-like waveform obtained from microwave signals reflected from a person.

Figure 4:
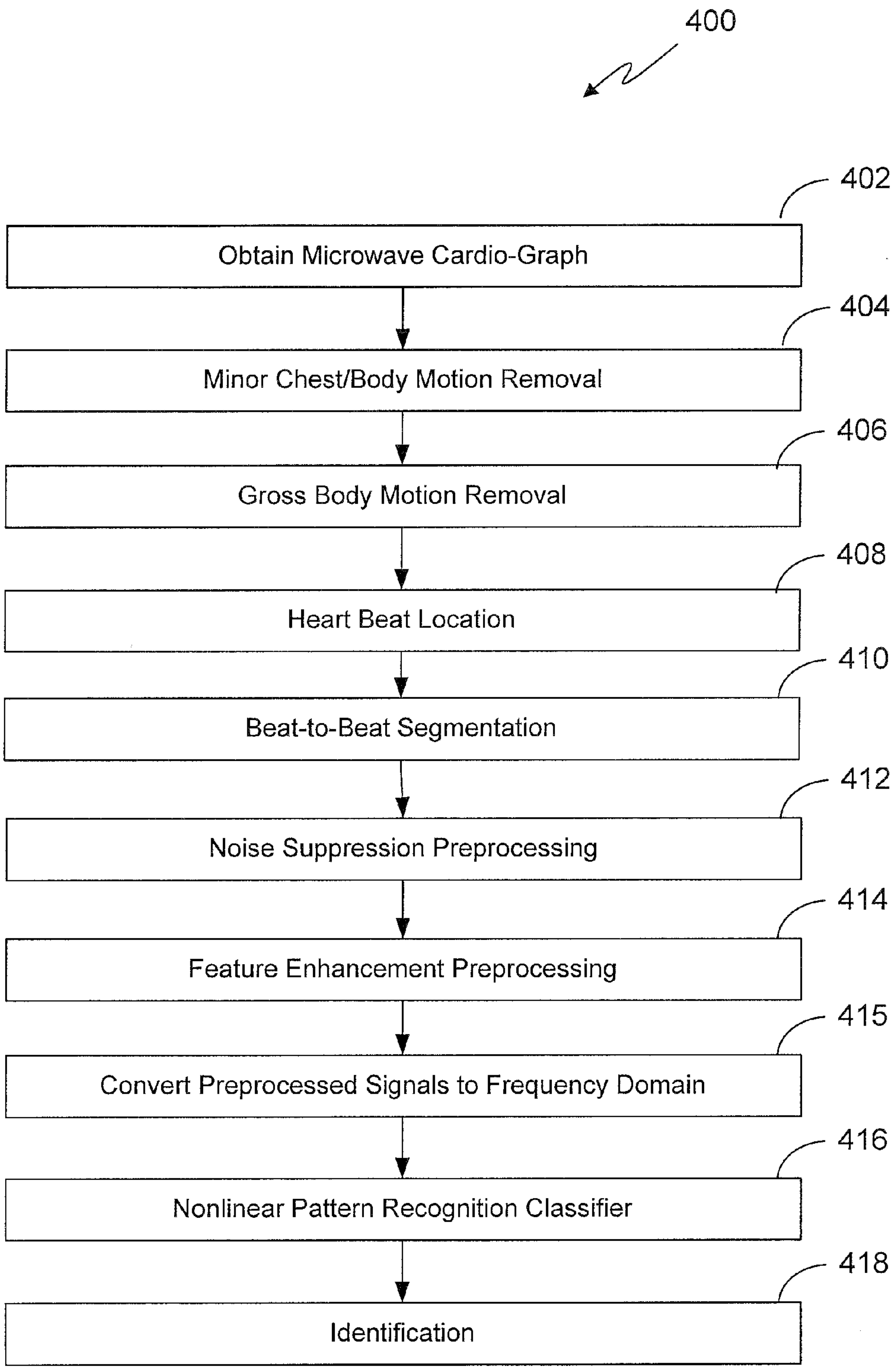
FIG. 4 is a flow chart of a process for obtaining and processing microwave cardiac signals for biometric identification in accordance with one embodiment of the invention.

FIG. 4 is a flow chart of a process 400 for obtaining and processing microwave cardiac signals for biometric identification in accordance with one embodiment of the invention. The process can first obtain or receive (402) the microwave cardiograph. In several embodiments, the microwave cardiograph is obtained from a microwave cardiac measurement system such as the one described above in FIG. 3. The process then removes (404) signal components of the microwave cardiograph related to minor chest and/or body motion. The process then removes (406) signal components of the microwave cardiograph related to gross body motion. The process can then determine (408) heart beat locations within the microwave cardiograph. The process can then perform beat-to-beat segmentation (410) to isolate heart beats for subsequent analysis. The process then performs noise suppression preprocessing (412) to remove undesirable noise characteristics. The process then performs feature enhancement preprocessing (414) to enhance particular features useful for identification. The process then converts the preprocessed signals to the frequency domain (415) for improved waveform comparison. The process then performs pattern recognition using a classifier (416) to identify cardiac signatures in the frequency domain. The process then uses the cardiac signatures to perform identification (418).

In one embodiment, the process can perform the sequence of actions in a different order. In another embodiment, the process can skip one or more of the actions. In other embodiments, one of more of the actions are performed simultaneously. In some embodiments, additional actions can be performed.

In some embodiments, the major process steps include location of each heartbeat from the reflected microwave signal (which can involve a complex procedure to remove the effects of gross body motion), followed by post-processing steps to remove mild motion effects, heart-beat segmentation, and feature enhancement prior to the pattern recognition step to determine the identification of the individual from the cardiac microwave signal.

The process blocks or sub-processes of FIG. 4 are further described throughout the detailed description and are identified by a corresponding heading.

Minor Chest/Body Motion Removal (404):

In this section, the details of the signal processing algorithm developed to remove the effects of mild body motion such as chest motion due to respiration are described. The unprocessed microwave return signals from a human with mild motion that could be from normal or heavy breathing introduces low-to-mid-frequency amplitude variations in the microwave signal. This mild motion effect should generally be removed since the baseline amplitude variations due to breathing and minor chest motion can cause a signal amplitude variation of at least 0.1 volts (V) to 1 V, while the reflected microwave-cardiac signal typically is about 5 millivolts (mV) to 100 mV, depending on the transmitted power. The microwave baseline variation due to such mild motion is therefore anywhere from two times to ten times that of the desired cardiac signal. Typical examples of cardiac microwave signals during mild motions are illustrated as follows.

Figure 5A:
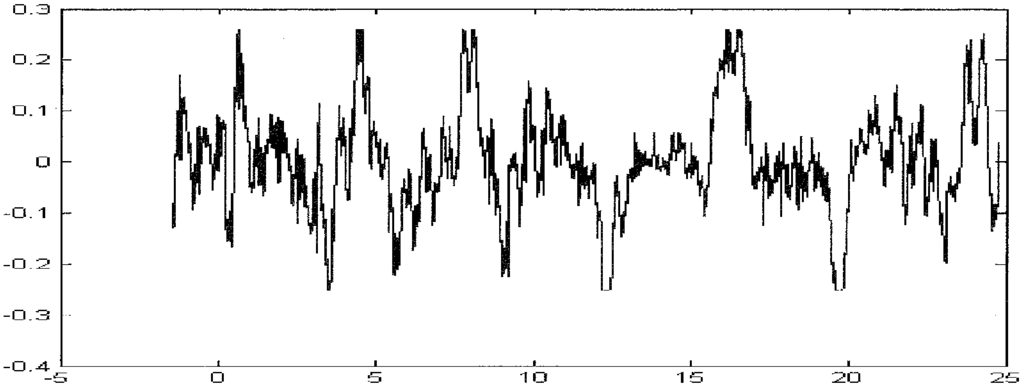
FIG. 5*a* is a graph of a microwave cardiac signal for a human containing variations associated with normal to heavy breathing in accordance with one embodiment of the invention.

FIG. 5*a* is a graph of a microwave cardiac signal for a human containing variations associated with normal to heavy breathing in accordance with one embodiment of the invention.

Figure 5B:
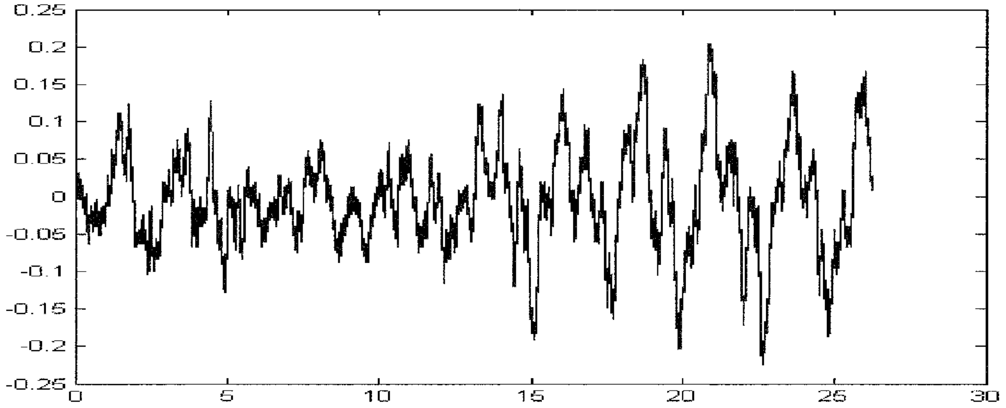
FIG. 5*b* is a graph of a microwave cardiac signal for a human containing variations associated with chest motion in accordance with one embodiment of the invention.

FIG. 5*b* is a graph of a microwave cardiac signal for a human containing variations associated with chest motion in accordance with one embodiment of the invention.

In several embodiments, the first couple steps in the process (e.g., motion removal) involve a baseline removal technique to ensure that some of the low frequency components (due to gross motion of the individual) are removed and the resultant output is a approximately zero-mean signal. High-pass filtering with an finite impulse response (FIR) or infinite impulse response (IIR) filter could potentially reduce or completely remove the baseline variations. However, note that the baseline variations due to human body motion are generally non-stationary in nature, and the amplitude and frequency of the baseline variations change rapidly over time. While not bound by any particular theory, it is well known that the standard Fourier Transform and linear IIR/FIR filters such as Butterworth or Chebychev filters cannot reliably filter non-stationary signals such as the ones seen in FIGS. 5*a* and 5*b*. The short-time Fourier Transform (STFT) is capable of handling non-stationary signals to some degree. However, since the window for the STFT is fixed, the level of non-stationarity in the signal needs to be known a-priori for the STFT to work effectively.

To handle these non-stationarities in the microwave standing-wave signals, wavelet filtering can be employed to remove the baseline variations. The system can use a Discrete Wavelet Transform (DWT) adaptive motion rejection process where slowly varying portions of the signal with high-amplitude are removed, while retaining the low-amplitude signal segments and the signal segments with high frequency components. The DWT is a transform of the original signal that does a multi-scale representation of the input signal over time. It is a sequential tree-based multi-scale signal representation using wavelet basis functions. The wavelet transform involves "breaking" down or decomposing the signal into low and high frequency components (or approximation and detail coefficients) in a sequential manner, shown for example as blocks "A" and "D" in FIG. 6.

Figure 6:
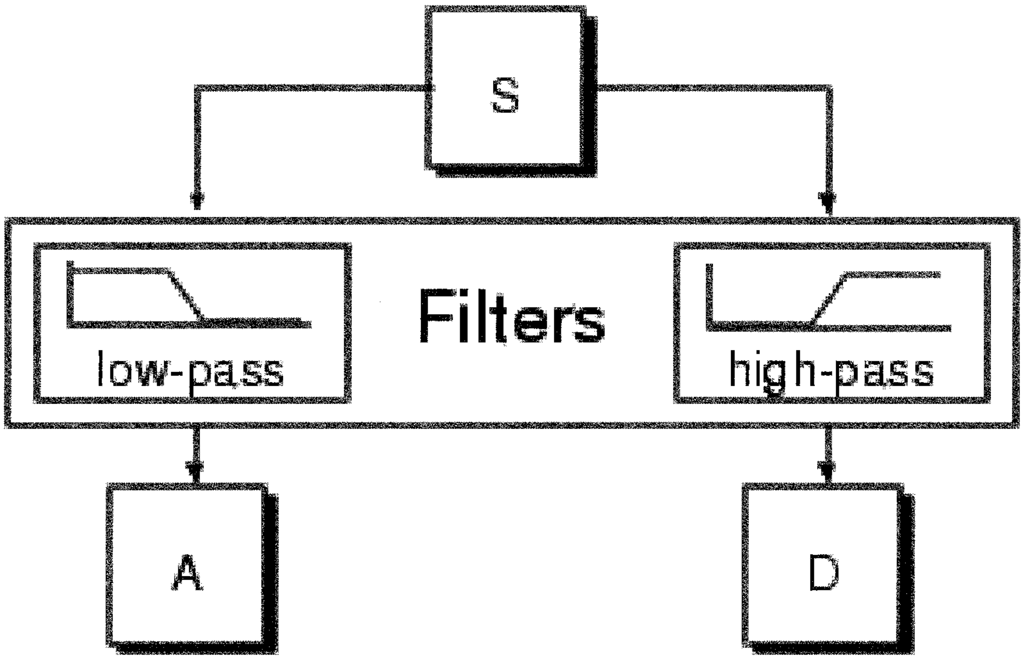
FIG. 6 is a schematic block diagram of a discrete wavelet transform used for removal of signal components corresponding to minor chest motion within a microwave cardiac signal in accordance with one embodiment of the invention.

FIG. 6 is a schematic block diagram of a discrete wavelet transform used for removal of signal components corresponding to minor chest motion within a microwave cardiac signal in accordance with one embodiment of the invention. The sequence in the wavelet tree represents a recursive breakdown of each time segment into finer and finer detail-coefficients and approximation-coefficients. The choice of the wavelet basis function is application and domain specific where particular wavelet filter functions can be used to highlight specific signal components. This multi-scale representation of each temporal segment allows the nonlinear filtering of a signal over different time scales. It is believed that this result cannot be achieved with other transforms and processing methodologies.

Figure 7:
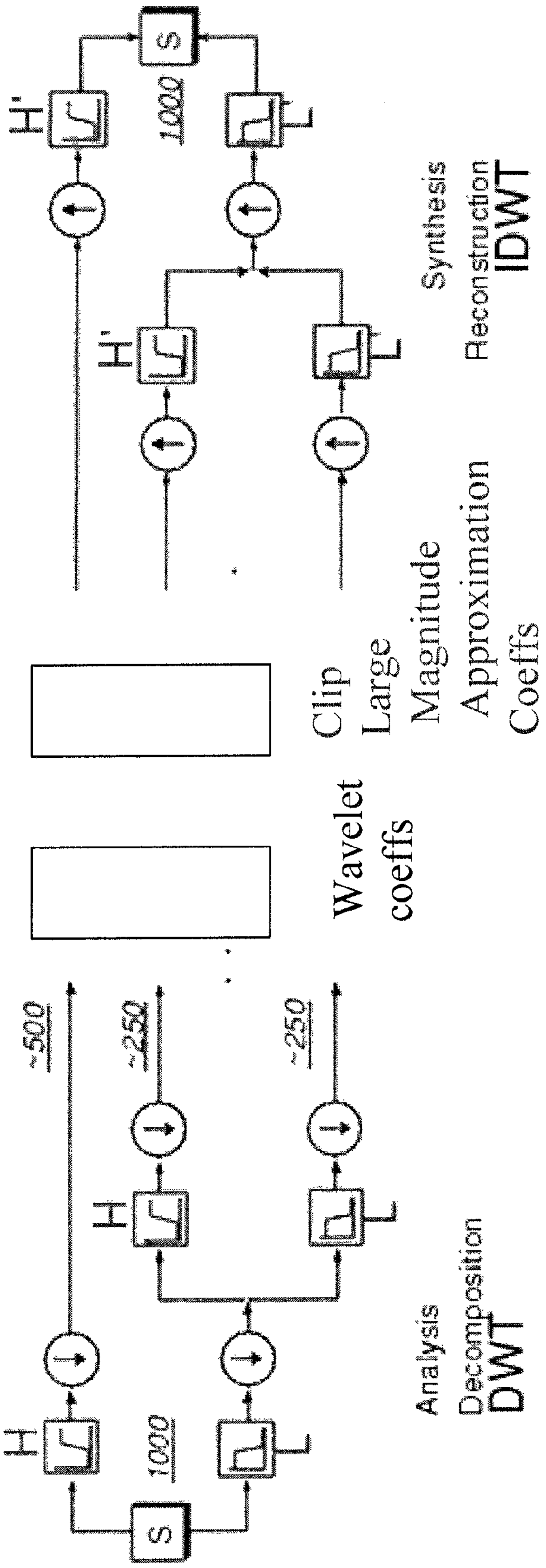
FIG. 7 is a schematic block diagram illustrating a process for mild motion suppression including decomposition, filter processing, and reconstruction of a microwave cardiac signal in accordance with one embodiment of the invention.

FIG. 7 is a schematic block diagram illustrating a process for mild motion suppression including decomposition, filter processing, and reconstruction of a microwave cardiac signal in accordance with one embodiment of the invention. For the mild motion suppression, a wavelet baseline removal technique can be used where all of the wavelet coefficients larger than a certain magnitude are considered. Most of the larger magnitude wavelet approximation coefficients contain the temporal baseline variation information. All of the large magnitude wavelet approximation coefficients can be clipped to a fixed (pre-determined) or adaptive, positive or negative value, depending on the sign of the specific wavelet coefficient. If these large valued coefficients are assigned to zero, the process risks losing some of the heart-beat information. Instead, clipping these large valued coefficients ensures that heart-beat signatures are preserved during the baseline removal process. Other variations in microwave cardiac signals may also be considered and processed. For example, in one embodiment, the wavelet approximation coefficients are clipped using a dynamically adaptive amplitude algorithm.

Figure 8A:
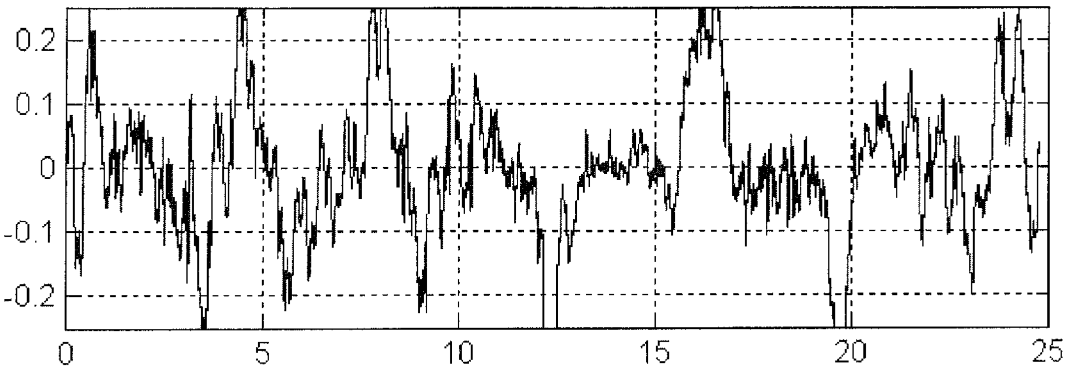
FIG. 8*a* is a graph of a microwave cardiac signal for a human containing variations associated with normal to heavy respiration in accordance with one embodiment of the invention.
Figure 8B:
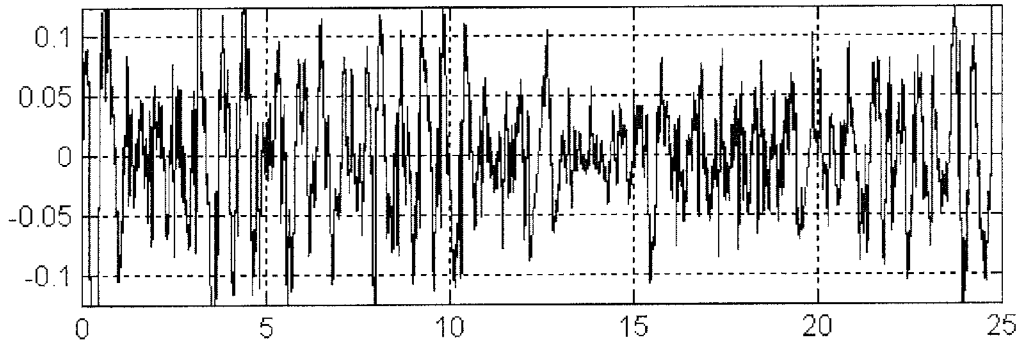
FIG. 8*b* is a graph of the microwave cardiac signal of FIG. 8*a* after a mild motion removal process was performed on the microwave cardiac signal in accordance with one embodiment of the invention.
Figure 9A:
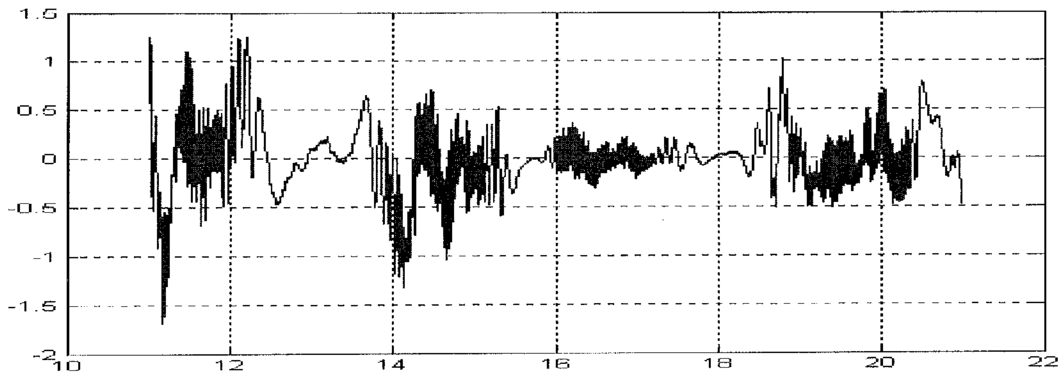
FIG. 9*a* is a graph of a microwave cardiac signal indicative of a human in motion in accordance with one embodiment of the invention.
Figure 9B:
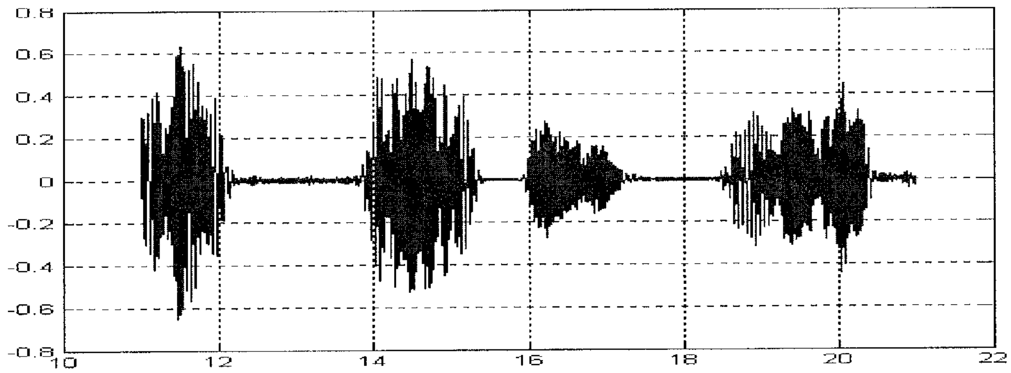
FIG. 9*b* is a graph of the microwave cardiac signal of FIG. 9*a* after a mild motion removal process was performed on the microwave cardiac signal in accordance with one embodiment of the invention.
Figure 10:
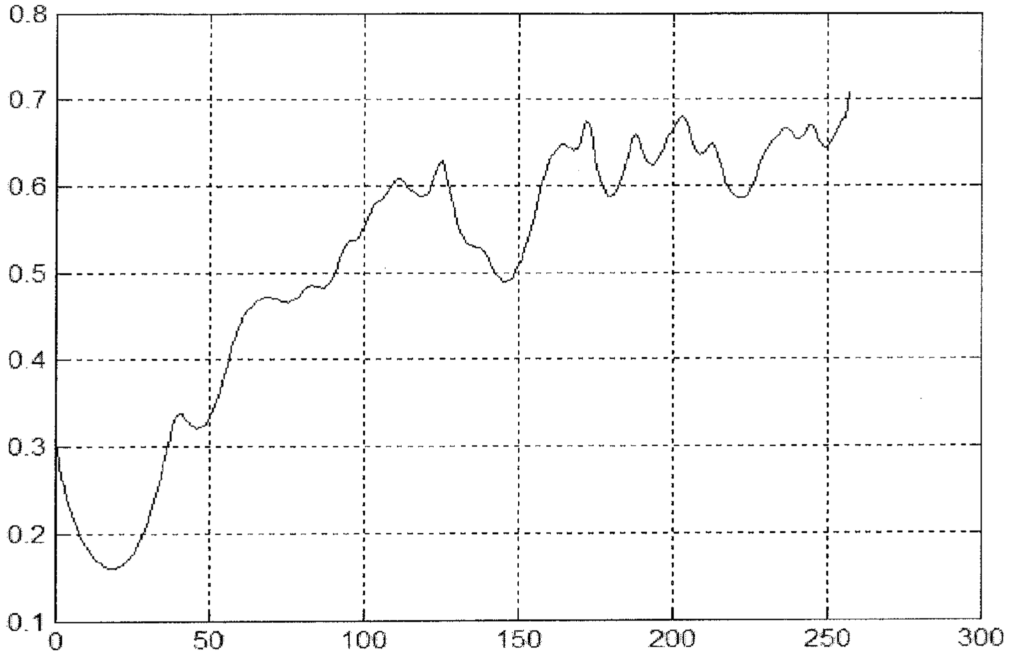
FIGS. 10-13 are graphs of the power spectral density of a segmented beat of microwave cardiac signals for four individuals used as inputs to a classifier for a biometric identification system in accordance with one embodiment of the invention.
Figure 11:
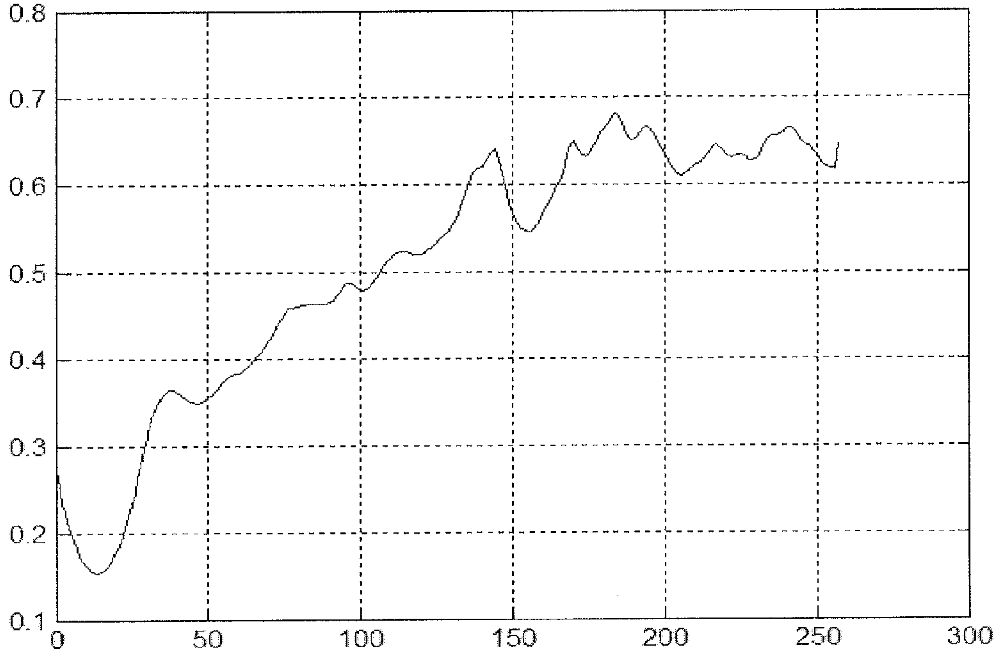
Figure 12:
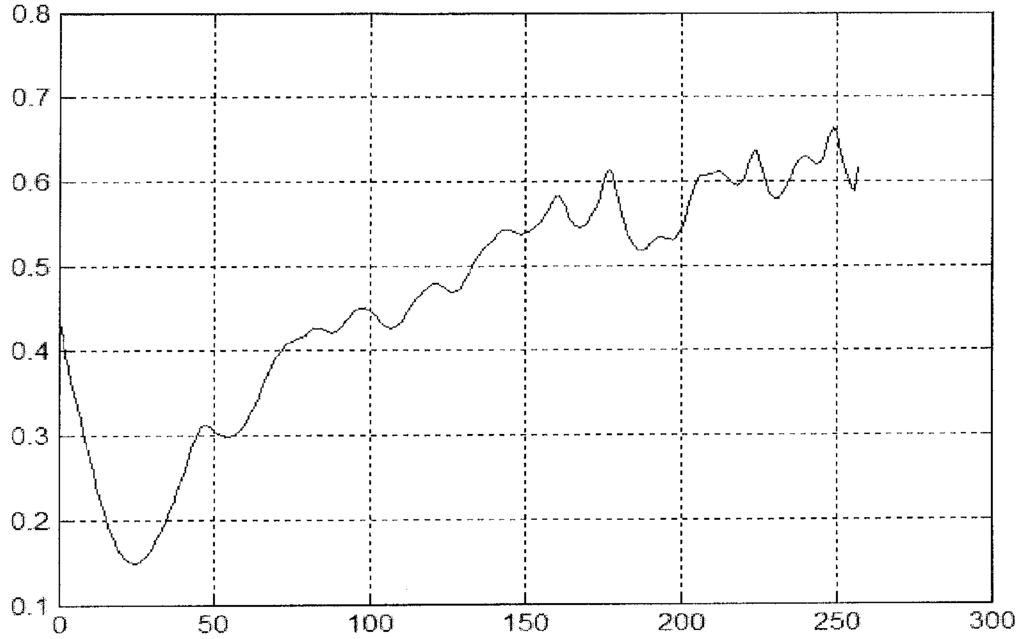
Figure 13:
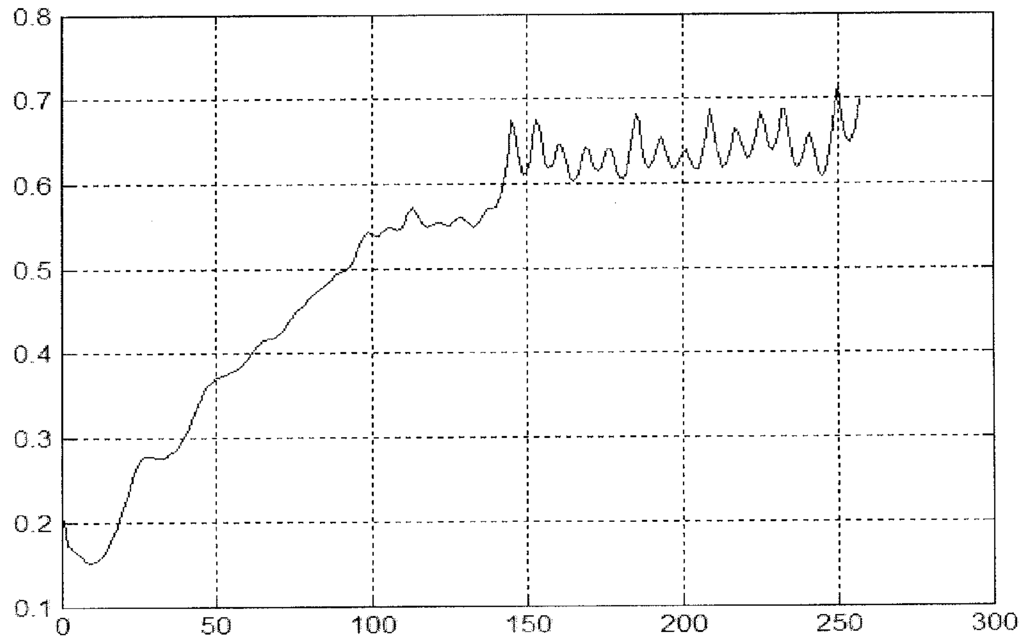

FIG. 8*a* is a graph of a microwave cardiac signal for a human containing variations associated with normal to heavy respiration in accordance with one embodiment of the invention. In particular, FIG. 8*a* shows the reflected microwave signal from an individual with heavy breathing. Note the baseline variations due to the chest motion. The baseline variations are non-stationary in nature, and show higher amplitudes during the first 10 seconds, and faster but lower amplitude variations in the later half of the measurement. The wavelet baseline removal algorithm effectively removes the breathing effects in the microwave signal baseline, as shown in FIG. 8*b*. FIGS. 9*a* and 9*b* show the results of the wavelet baseline removal technique using the concept illustrated in FIG. 7 on a microwave return signal from a human moving towards the sensor. As seen in FIG. 9*b*, the DC component after wavelet processing is zero or approximately zero.

Gross Body Motion Removal (406):

In several embodiments, the process next removes "noise" in the signal arising from gross/major body motion. Large motion manifests itself as large sinusoidal components in the reflected microwave signal. To address these components, the system can perform a real-time estimate of sinusoidal elements of the signal and remove the sine components. A zero-crossing sine wave estimation is computed to accommodate dynamic changes in amplitude and frequency in the sine-wave associated with body motion.

Segmentation: Heart Beat Location (408):

After preprocessing the signal, a segmentation step needs to locate the center of each beat with a high degree of accuracy. A template correlation solution can be used, where a template heart-beat is constructed from several exemplary 'training" examples of heart beats. This template is correlated with the preprocessed microwave signal to yield peaks at the center of each beat. The location of each peak determines the beat-center and the gives a segmented heart signal.

Microwave Cardiac Biometric Identification for Beat-By-Beat Classification (410):

In this section the issues and challenges with the microwave reflected signals are first discussed, followed by a discussion of various techniques for addressing these issues.

While not bound by any particular theory, a close analysis of microwave cardiac processed signals showed that the features (e.g. peaks, valleys) and distances (time extent) between significant features varied for a single individual. This variability of the features was observed to be a function of the change in heart rate over time. In general, when the heart rate of the individual increased, the features (and the distance between the features) were noted to be "compressed" in time, and when the heart rate dropped, the features (and the distance between the features) were seen to be more expanded over time. This is because the microwave cardiac signal captures the cardiac-induced micro-mechanical motions of the chest (or torso), and the blood volume changes due to the heart, where both characteristics are inherently more affected by the heart rate variability. In contrast, the ECG-related part of the microwave signal that captures the electrical activity of the heart may be less sensitive to the heart rate variability.

The "sensitivity" of the microwave cardiac features to the heart rate variability affects the classification accuracy. For individuals that have more or less constant heart rate over time and during different measurement runs, the microwave cardiac signal features are consistent and therefore the biometric identification classification accuracy for such individuals can be very good. However for those individuals whose heart rate changes more rapidly over time, the microwave cardiac features from one beat to another are compressed or expanded, and therefore the identification/classification based on these signals will not be as accurate.

To de-sensitize the microwave cardiac identification algorithm to such feature changes, a novel preprocessing "time-normalization" solution was designed. The heart-beat segmentation algorithm discussed earlier determines the heart rate of an individual over time based on the reflected microwave cardiac signal. In one embodiment, the primary concept is to segment the microwave signal for each beat, and also note the corresponding heart rate at each beat. The microwave signal for each beat based on the heart rate can then be scaled, where microwave signal segments that have a high heart rate are scaled down or expanded in time, and microwave signal segments that have a low heart rate are scaled up or compressed in time. In one embodiment, a high heart rate is about 150 beats per minute while a low heart rate is about 50 beats per minute. This time-based beat-by-beat normalization can ensure that all of the segmented microwave cardiac beats now have features that are aligned better and are less affected by the heart rate variability.

There still may be, however, a slight temporal misalignment of the features between different beat segments. To make the classification algorithm more tolerant to such minor misalignments, the power spectral density (PSD) of each scaled/time-normalized microwave heart-beat signal can be computed and the PSD spectral values passed as inputs to a tree-based classifier. The PSD frequency components are not sensitive to misalignments in the microwave cardiac signals that will be visible in time-domain signal vectors, either due to slight errors in locating the microwave cardiac peaks or due to minor misalignments in the signal features after the time-scaling that may be caused by small errors in heart rate estimates. This two-step time-normalization technique can be added to the preprocessing steps discussed in the section above, and significantly improves the accuracy of the identification classification.

Based on the above signal descriptions, observations and analysis, signal preprocessing techniques for microwave cardiac based biometric identification are outlined as follows.

Noise Suppression Preprocessing (412):

The noise suppression preprocessing can be used to remove undesirable noise characteristics and can include band-stop filtering, linear phase high pass filtering, and zero-mean signal amplitude normalization.

A. Band-Stop Filtering:

The sub-processes can include band-stop filtering to remove noise due to RF reflections from fluorescent lighting.

B. Linear Phase High-Pass Filtering:

The sub-processes can include linear phase high-pass filtering to reject low-frequency components caused by minor body motion and normal breathing. The linear phase characteristics can ensure that no phase distortions are introduced in the filtering process. This can be important for the microwave cardiac biometric identification problem since phase distortions of the microwave signal from non-linear phase filters may deteriorate the accuracy of the biometric identification algorithm.

C. Zero-Mean Signal Amplitude Normalization:

The amplitude of the cardiac-related microwave signal can vary significantly, even during the course of a single beat. Therefore, a dynamic amplitude correction may need to be done to compensate for the amplitude variations due to very minor motions and/or minor pose variations. There are two effects on the microwave signal, including a dynamic variation in the mean of the signal and a dynamic "scaling" of the amplitude, both of which can be cancelled out. Therefore the following steps can be carried out to achieve dynamic zero-mean signal normalization.

1. A running mean $\bar{f}_{tlocal}(t)$ of the microwave cardiac signal is computed and subtracted from the signal.
2. The local energy $$\left\{\sum_{tlocal}[f(t)-\bar{f}_{tlocal}(t)]^2\right\}^{0.5}$$

of the signal after zero-mean is computed, and the local signal is normalized against the local energy. This can be done at every portion of the microwave signal.

The signal normalization approach is shown in the equation below:

$$fnorm(t)=\frac{f(t)-\bar{f}_{tlocal}(t)}{\left\{\sum_{tlocal}[f(t)-\bar{f}_{tlocal}(t)]^2\right\}^{0.5}}$$

This normalized signal can then be fed into the classifier for identification.

Feature Enhancement Preprocessing (414):

A. Time-Normalization of Each Beat:

The temporal location of the cardiac-related signal features for a single beat varies from one beat to another and is scaled up or down based on the corresponding heart rate for that beat. Therefore, the system can segment the cardiac signal for each beat, and also note the corresponding heart rate at each beat. The system can then scale the signal for each beat based on the heart rate. In such case, microwave cardiac signal segments that have a high heart rate are scaled down or expanded in time, whereas those signal segments that have a low heart rate are scaled up or compressed in time. This time-based beat-by-beat normalization can ensure that all segmented signal beats now have features that are aligned better and are less affected by the heart rate variability.

Conversion to Frequency Domain (415):

B. Frequency-Domain Description of Each Beat:

There still may be a slight temporal misalignment of the features between different microwave cardiac beat segments after the previous preprocessing step. To make the classification algorithm more tolerant to such minor temporal misalignments, the power spectral density (PSD) of each scaled/time-normalized microwave-related heart-beat signal can be computed and the PSD spectral values passed as inputs to the tree-based classifier (discussed in the next section). The PSD frequency components measure the power in the signal at each frequency and are not sensitive to misalignments in the microwave cardiac signals that will be visible in time-domain signal vectors, either due to slight errors in locating the cardiac peaks or due to minor misalignments in cardiac-related features after the time-scaling that may be caused by small errors in heart rate estimates. The PSD frequency values are then passed to the tree-based classifier, discussed below, for biometric identification.

FIGS. 10-13 are graphs of the power spectral density of a segmented beat of microwave cardiac signals for four individuals used as inputs to a classifier for a biometric identification system in accordance with one embodiment of the invention. Note that the PSD signals for different individuals have uniquely distinct "signatures".

Figure 14:
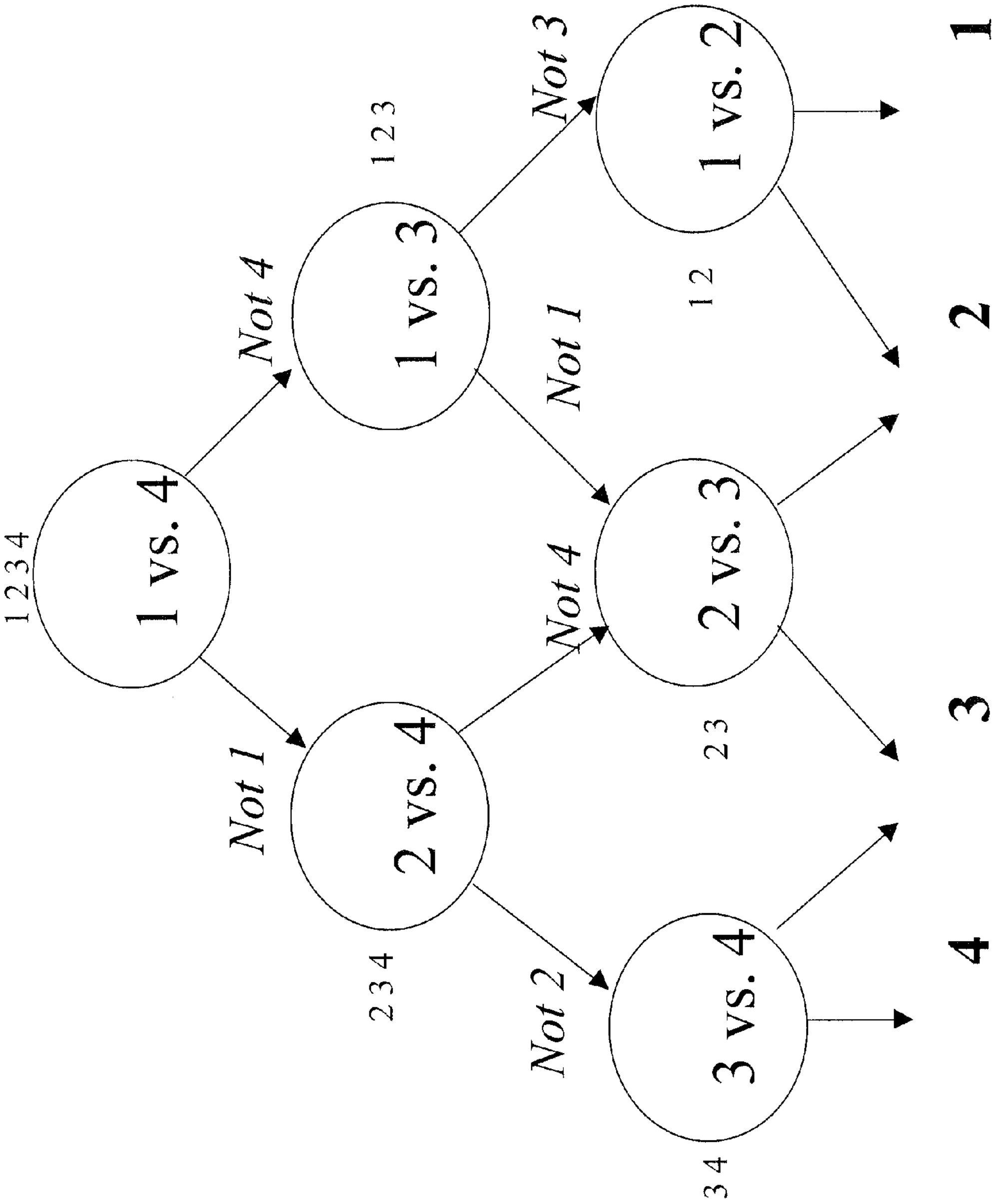
FIG. 14 is a decision tree that can be used by a classifier considering four individuals in a biometric identification system in accordance with one embodiment of the invention.

Non-Linear Pattern Recognition Classifier (416):

FIG. 14 is a decision tree that can be used by a classifier considering four individuals in a biometric identification system in accordance with one embodiment of the invention. The classifier that was designed can be used for multiple classes and is a binary nonlinear classifier with a directed acyclic graph (DA) structure. A rule-based decision tree can be used, where each node in the decision tree eliminates one class from the list. The list is initialized with a list of all classes (individual identification labels). A test point is evaluated against the decision node that corresponds to the first and last elements of the list. Each node implements a binary decision of one "class" (label) versus another "class" (label or individual identification). If the node (binary nonlinear classifier) prefers one of the two classes, the other class is eliminated from the list and the decision tree proceeds to test the first and last elements of the new list. The decision tree terminates when only one class remains in the list. Thus, for a problem with N individuals, N−1 decision nodes (or binary classifiers) will be evaluated in order to derive an answer.

Identification (418):

These signal preprocessing techniques and multi-class classifier for biometric identification were tested on a dataset of 11 individuals. The results of the microwave cardiac-based biometric identification are illustrated in FIGS. 15-17 for various numbers of heartbeats considered.

FIG. 15 is a table showing a classification identification matrix resulting from inputting microwave cardiac signals for eleven individuals into a classifier while considering three heartbeats for identification estimation in accordance with one embodiment of the invention. The classification is represented as a ratio, with a 1.0 on a diagonal element denoting perfect classification. Each row represents the true identity, and each column represents the identity label estimated by the classifier. The last column shows the ratio of cases where no clear majority was found out of the three beats. The overall classification accuracy using the majority classifier on just three microwave cardiac heart beats was about 90%.

FIG. 16 is a table showing a classification identification matrix resulting from inputting microwave cardiac signals for eleven individuals into a classifier while considering five heartbeats for identification estimation in accordance with one embodiment of the invention. The classification is represented as a ratio, with a 1.0 on a diagonal element denoting perfect classification. Each row represents the true identity, and each column represents the identity label estimated by the classifier (same as the first matrix). The last column shows the ratio of cases where no clear majority was found out of the three beats. The overall classification accuracy on a population of 11 individuals using the majority classifier on just five microwave cardiac heart beats was about 93%.

FIG. 17 is a table showing a classification identification matrix resulting from inputting microwave cardiac signals for eleven individuals into a classifier while considering seven heartbeats for identification estimation in accordance with one embodiment of the invention. The classification is represented as a ratio, with a 1.0 on a diagonal element denoting perfect classification. Each row represents the true identity, and each column represents the identify label estimated by the classifier. The last column shows the ratio of cases where no clear majority was found out of the three beats. The overall classification accuracy on a population of 11 individuals using the majority classifier on just seven microwave cardiac heart beats was about 94%. As such, these results indicate that the microwave cardiac-related signal can be a valid biometric.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In some embodiments, depending on specific applications, the signal preprocessing steps and the classifier used could be modified to incorporate issues unique to each application. For example, the classifier could be modified to a hierarchical model where groups of individuals are initially assigned to each node in the decision tree, rather than single individuals, and individual identification is carried out at lower levels in the decision process. This would greatly improve the speed of biometric identification when the number of individuals in the library is very large. In one embodiment, the classification process could also make use of "one versus all" classifiers for some applications including identity verification. In some embodiments, the feature extraction processes could involve inclusion of pose-specific features and shape features such as peak/valley locations in each beat that could be used in the classification process. In one embodiment, shift-invariant filters could be used to provide better tolerance to errors in beat-to-beat segmentation.

What is claimed is:

1. A system for biometrically identifying a person using microwave signals, the system comprising:

at least one processor configured to:

receive a microwave cardiac signal comprising cardiac beats, the microwave cardiac signal obtained from reflected microwave signals comprising an electrocardiographic-related waveform and an impedance-cardiographic-related waveform;

segment the microwave cardiac signal into segments;

extract features from the segments; and perform pattern identification of the segments and features with a pre-existing data set.

2. The system of claim 1, further comprising:

a receiver configured to receive a microwave signal, where the microwave cardiac signal comprising the cardiac beats is derived from the received microwave signal.

3. The system of claim 2, wherein each cardiac beat is segmented into one of the segments.

4. The system of claim 1, wherein the microwave cardiac signal comprises information indicative of a volume of blood of the person.

5. The system of claim 4, wherein the microwave cardiac signal comprises information indicative of an extracellular ion concentration of the person.

6. The system of claim 4, wherein the information is indicative of the volume of blood in a portion of the person illuminated by incident microwave signals.

7. A method for biometrically identifying a person using microwave signals, the method comprising:

receiving a microwave cardiac signal comprising cardiac beats, the microwave cardiac signal obtained from reflected microwave signals comprising an electrocardiographic-related waveform and an impedance-cardiographic-related waveform;

segmenting the microwave cardiac signal into individual segments;

extracting features from the segments; and performing pattern identification of the features in the individual segments with a pre-existing data set.

8. The method of claim 7, further comprising:

receiving a microwave signal reflected from a person; and deriving the microwave cardiac signal from the received microwave signal.

9. The method of claim 7, wherein each segment corresponds to one of the cardiac beats.

10. A method for remote biometric identification using microwave cardiac signals, the method comprising:

generating and directing first microwave energy in a direction of a person;

receiving microwave energy reflected from the person, the reflected microwave energy indicative of cardiac characteristics of the person, the cardiac characteristics comprising an electrocardiographic-related characteristic and an impedance-cardiographic-related characteristic;

segmenting a signal indicative of the reflected microwave energy into a waveform indicative of a plurality of heart beats and the cardiac characteristics;

identifying patterns in the microwave waveform; and identifying the person based on the identified patterns and a stored microwave waveform.

11. The method of claim 10, further comprising removing characteristics of the reflected microwave energy indicative of a body motion of the person.

12. The method of claim 11, wherein the removing characteristics of the reflected microwave energy indicative of the body motion of the person comprises removing characteristics of the reflected microwave energy indicative of minor body motion of the person.

13. The method of claim 12, wherein the removing characteristics of the reflected microwave energy indicative of the minor body motion of the person comprises using a discrete wavelet transform to remove preselected portions of a signal indicative of the reflected microwave energy.

14. The method of claim 13, wherein the using the discrete wavelet transform comprises clipping substantially all wavelet approximation coefficients greater than a preselected magnitude.

15. The method of claim 13, wherein the using the discrete wavelet transform comprises clipping wavelet approximation coefficients in accordance with a dynamically adaptive amplitude algorithm.

16. The method of claim 11, wherein the removing characteristics of the reflected microwave energy indicative of the body motion of the person comprises removing characteristics of the reflected microwave energy indicative of major body motion of the person.

17. The method of claim 16, wherein the removing characteristics of the reflected microwave energy indicative of major body motion of the person comprises removing preselected sinusoidal elements of a signal indicative of the reflected microwave energy.

18. The method of claim 10, further comprising determining a location in the reflected microwave energy indicative of a heart beat of the person.

19. The method of claim 18, wherein the determining the location in the reflected microwave energy indicative of the heart beat of the person comprises using a template correlation algorithm.

20. The method of claim 10, wherein the segmenting the reflected microwave energy into the waveform comprising the plurality of heart beats comprises:

band-stop filtering of a signal indicative of the reflected microwave energy;

high-pass filtering to reject low frequency signal components indicative of minor body motion and normal breathing; and performing a dynamic amplitude correction to compensate for a body motion or a pose of the person.

21. The method of claim 10, further comprising processing the microwave waveform to remove preselected noise characteristics and enhancing preselected features of the microwave waveform.

22. The method of claim 21, wherein the processing the microwave waveform comprises:

band-stop filtering of a signal indicative of the reflected microwave energy;

high-pass filtering to reject low frequency signal components indicative of minor body motion and normal breathing; and performing a dynamic amplitude correction to compensate for a body motion or a pose of the person.

23. The method of claim 21, wherein the enhancing preselected features of the microwave waveform comprises processing the microwave waveform to remove effects related to a heart rate variability of the person.

24. The method of claim 23, wherein the processing the microwave waveform to remove effects related to the heart rate variability comprises:

scaling down, in time, heart beat segments of the microwave waveform above a first preselected threshold heart rate; and scaling up, in time, heart beat segments of the microwave waveform below a second preselected threshold heart rate.

25. The method of claim 10, wherein the identifying patterns in the microwave waveform comprises:

computing a frequency domain transform of the microwave waveform; and identifying patterns in the power spectral density of the microwave waveform.

26. The method of claim 25, wherein the computing the frequency domain transform of the microwave waveform comprises computing a power spectral density of the microwave waveform.

27. The method of claim 26, wherein the identifying patterns in the power spectral density of the microwave waveform comprises using a preselected number of heartbeats to generate a cardiac signature comprising a portion of the power spectral density.

28. The method of claim 27, wherein the identifying the person based on the identified patterns and the stored microwave waveform comprises comparing the generated cardiac signature with at least one stored microwave waveform.

29. The method of claim 28, wherein a preselected degree of correlation between the generated cardiac signature and a stored microwave waveform of one of the at least one stored microwave waveform is indicative of an identification match.

30. The method of claim 28, wherein the comparing the generated cardiac signature with the at least one stored microwave waveform comprises using a decision tree to compare the generated cardiac signature with multiple stored microwave waveforms of the at least one stored microwave heart beats waveform.

31. The method of claim 10, wherein the cardiac characteristics further comprise a phonocardiographic-related characteristic.

32. The method of claim 10, wherein the identifying patterns in the microwave waveform comprises extracting features from the microwave waveform.

33. The method of claim 32, wherein the extracted features comprise at least one characteristic, in the microwave waveform, selected from the group consisting of peaks, valleys, and distances.

34. The method of claim 32, wherein the identified patterns comprise the extracted features.

35. A system for remote biometric identification using microwave cardiac signals, the system comprising:
- microwave measurement circuitry configured to:
  - generate a microwave signal;
  - transmit the microwave signal in a direction of a person;
  - receive microwave energy reflected from the person, the reflected energy comprising cardiac characteristics of the person, the cardiac characteristics comprising an electrocardiographic-related characteristic and an impedance-cardiographic-related characteristic; and
  - generate a signal indicative of the reflected microwave energy; and
- processing circuitry configured to:
  - segment the reflected microwave energy signal into a microwave waveform indicative of a plurality of heart beats and the cardiac characteristics;
  - identify patterns in the microwave waveform; and
  - identify the person based on the identified patterns and a stored microwave waveform.

36. The system of claim 35, wherein the processing circuitry is configured to:
- perform signal processing on the reflected microwave energy signal to reduce effects of a body motion of the person and a heart rate variability of the person; and
- extract features in the microwave waveform, wherein the identified patterns include the extracted features.

37. The system of claim 36, wherein the processing circuitry is configured to:
- compute a power spectral density of the microwave waveform; and
- identifying patterns in the power spectral density of the microwave waveform.

38. The system of claim 35, wherein the microwave measurement circuitry comprises a phase control circuit configured to reduce effects of a body motion of the person by compensating for a transmitter signal energy that leaks into a receiver portion of the microwave measurement circuitry.

39. The system of claim 38, wherein the phase control circuit is configured to compensate for internal reflections in the microwave measurement circuitry.

40. The system of claim 38, wherein the phase control circuit is configured to adjust a phase and an amplitude of a the transmitter signal energy to compensate for the transmitter signal energy that leaks into the receiver portion of the microwave measurement circuitry.

* * * * *

UNITED STATES PATENT AND TRADEMARK OFFICE

CERTIFICATE OF CORRECTION

PATENT NO. : 8,232,866 B2
APPLICATION NO. : 12/977740
DATED : July 31, 2012
INVENTOR(S) : William R. McGrath et al.

It is certified that error appears in the above-identified patent and that said Letters Patent is hereby corrected as shown below:

In the Claims

| | |
|---|---|
| Column 16, Claim 25, line 63 | Delete "comprises:"<br>Insert -- comprise: -- |
| Column 16, Claim 27, line 64 | Delete "comprises:"<br>Insert -- comprise -- |
| Column 17, Claim 32, line 19 | Delete "comprises"<br>Insert -- comprise -- |

Signed and Sealed this
Twentieth Day of August, 2013

Teresa Stanek Rea
*Acting Director of the United States Patent and Trademark Office*